May 2, 1967    R. C. BRUMFIELD    3,317,763
PULSED ELECTRICAL POWER GENERATION
Filed April 2, 1964

INVENTOR.
ROBERT C. BRUMFIELD
BY White & Haefliger
ATTORNEYS.

United States Patent Office 3,317,763
Patented May 2, 1967

3,317,763
PULSED ELECTRICAL POWER GENERATION
Robert C. Brumfield, Laguna Beach, Calif., assignor, by mesne assignments, to MHD Research, Inc., a wholly-owned subsidiary of Hercules Powder Company, a corporation of Delaware
Filed Apr. 2, 1964, Ser. No. 356,836
21 Claims. (Cl. 310—11)

This invention relates generally to magnetohydrodynamic power generation, and more particularly concerns apparatus and methods to produce high power electrical pulses.

It is a major object of the invention to provide a method and means for producing extremely high, short duration power pulses, as for example on the order of $10^{10}$ watts per cubic meter, the equipment utilized being characterized by low or zero power consumption in "primed" condition, as well as by compactness. Applications in which electrical power at these levels may be used for a fraction of a second include high power radar sets, sonar systems, X-ray sources, laser light pumps, magnetic metal forming devices, crossed-field accelerators and emergency communication systems.

In accordance with the invention, the above object may be realized through the provision of means for producing a high pressure burst of ionized gas and for traveling the gas burst along a downstream path, for producing a magnetic field subject to sudden disturbance by the gas travel, and for effecting generation of the electrical power pulse in response to the field disturbance. Typically, an explosive is located in a confined region and detonated to produce an explosive burst of ionized gas in the region, and the gas is caused to travel along a channel at velocities greater than 1,000 meters per second through a magnetic field and in such proximity to electrodes that an electrical pulse of greater than one megawatt flows in the electrodes. As will appear an additive is typically initially associated with the explosive, it being characterized as materially increasing the electrical conductivity of the gas in response to production of the burst.

Additional objects of the invention include the provision of a shaped explosive charge directed to effect downstream gas burst travel through the field at several thousand meters per second, the use of a cesium salt additive for seeding the charge and located to optimize the gas burst conductivity, the cushioning of the explosion of the charge in a combustion chamber opening into the magnetic field traversed channel, the lining of the channel with an insulative material into which the electrodes are typically sunk, the evacuation of the channel to optimize the power pulse, and the provision of a partially evacuated dump chamber or shell exposed to receive the combustion or explosion products from the channel forming test section.

These and other objects and advantages of the invention, as well as the details of an illustrative embodiment, will be more fully understood from the following detailed description of the drawings, in which.

Figure 1:
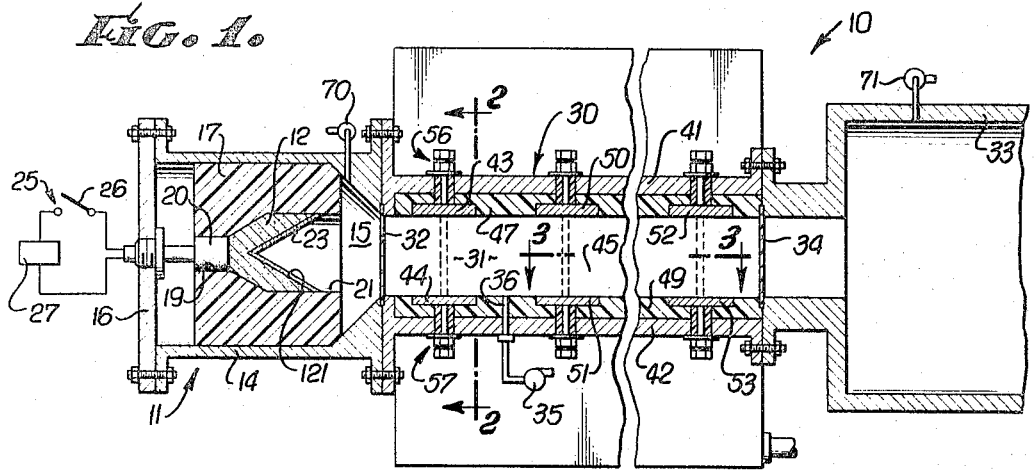
FIG. 1 is a side elevation taken in section through a typical apparatus for producing short duration, high power electrical pulses.

Referring first to FIG. 1, a typical means for producing a high pressure burst of ionized gas at high temperature is generally designated at 10 as including an explosion chamber 11 and an explosive 12 contained therein. The chamber 11 may comprise a suitable metal, and it includes a cylindrical body 14 having a forward opening 15 and a cap 16 at the rear side of the charge 12. Standing the charge off from the chamber walls and centering it within the chamber is a spacer 17 characterized as vaporizing in response to charge detonation or explosion, and as cushioning the explosive force transmitted outwardly toward the chamber body 14 and cap 16. Typically, the spacer 17 may comprise a polystyrene block having a rear bore 19 to receive the charge detonator 20 such as an electrically responsive blasting cap which sets off an explosive Primacord. The spacer block 17 fits within the body 14, and also has a front counterbore 21 to receive the explosive 12.

The latter may comprise a soild charge which is shaped to effect downstream travel of ionized gas through opening 15 and at velocities greater than 1,000 meters per second, and typically several thousand meters per second. Merely as illustrative, the charge may have a shaped conical recess at 121 and may consist of a shaped charge jet perforator, generally characterized as a waxed RDX (cyclo-trimethylene-trinitramine) composition. DuPont 20B Jet Perforators may be used for this purpose. At the front conical face of the charge is placed an additive material, shown as a thin layer 23, and characterized as materially increasing the electrical conductivity of the gas burst or hot plasma in response to production of the burst in the chamber 11, this function being referred to as seeding of the explosive charge. Useful seeding compositions of low ionization potential include cesium and its exothermic compounds or salts, such as cesium picrate, $CsCO_3$, $CsN_3$, $CsNO_3$, and $CsO_3$, potassium and its corresponding exothermic compounds or salts. Such compounds contribute materially to the energy of the system upon detonation. Tests indicate that charge surface seeding as described increases the output of the generator through reducing the internal impedance by a factor between 70 and 300. While the seed may alternatively be mixed or molded into the body of the charge 12, this method results in less conductivity of the gas than is found to result with surface seeding. Typically, an amount of seed is used which will optimize the current output of the generator, and cesium picrate has been found much more satisfactory than other seed compositions. The weight of cesium picrate for a 7.5 gm. explosive charge of the type described above should be within the range 100 to 300 milligrams, for optimum generator output. A circuit for effecting electrical detonation of the charge is indicated generally at 25 as including a switch 26 and a power supply 27.

Figure 2:
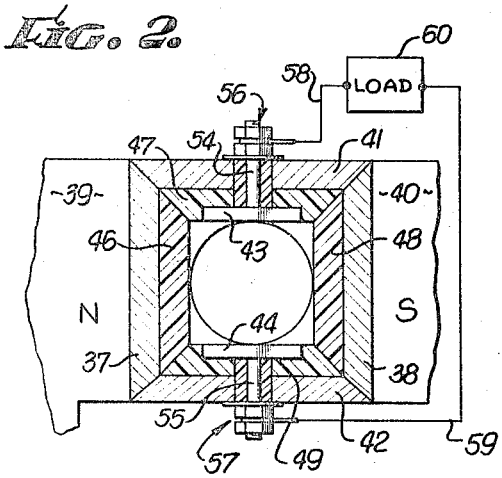
FIG. 2 is an enlarged section taken on line 2—2 of FIG. 1.
Figure 3:
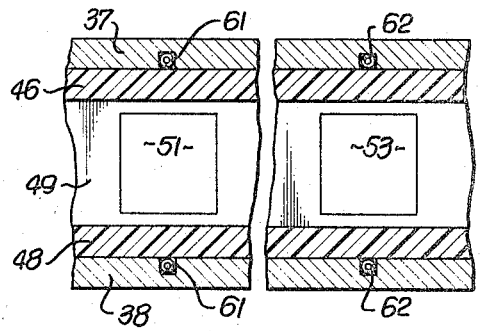
FIG. 3 is an enlarged fragmentary section taken on line 3—3 of FIG. 1.

The invention also contemplates the provision of means to travel the ionized gas burst along a downstream path and through a magnetic field, electroding being located to effect generation of the electrical power pulse in response to gas travel induced disturbance of the field. In this regard, FIGS. 1–3 illustrate a test section 30 forming a channel 31, the upstream use of which is separated from the combustion chamber outlet 15 by a diaphragm 32, and the downstream end of which is separated from a plenum chamber 33 by another diaphragm 34. The diaphragms are typically comprised of Mylar and are used to isolate the channel for evacuation as by a pump 35 having inlet communication at 36 with the channel 31, such evacuation tending to increase the power output of the generator through decreasing the resistance to downstream flow of detonation products in the channel. Pumps 70 and 71 may be provided to at least partially evacuate the combustion chamber 11 and the plenum shell 33, for the same reason.

As seen in FIG. 2, the test section and channel 31 are rectangular, with opposite plates 37 and 38 at the opposed faces of the magnet poles 39 and 40, and with opposite plates 41 and 42 outwardly of the opposed copper electrodes 43 and 44. As is clear from the drawings, the gases travel downstream in the direction of arrow 45, which is perpendicular to the magnetic field extending between the poles 39 and 40 and to the spacing direction of the electrodes, said spacing direction being vertical in FIG. 2 and perpendicular to the horizontal magnetic field direction. The plates 37 and 38 typically comprise soft iron magnetic material welded to the pole faces to pass the field with minimum reluctance, and the plates 41 and 42 are of non-magnetic material such as stainless steel.

Channel 31 is typically lined with electrically insulative material as is indicated by the four sheets 46 through 49 at the inner faces of the plates 37, 41, 38 and 42 respectively. The electrodes 43 and 44, as well as additional electrodes 50 and 51, and 52 and 53, are sunk into the respective sheets 47 and 49 so as to have their faces coterminous with the sheet faces, and also to be spaced from the plates 41 and 42. The plates lined with the insulative sheets are suitably joined to one another at corner locations as indicated best in FIG. 2. Suitable insulative lining may consist of a phenolic material such as Micarta.

Electrode pair 50 and 51 is downstream of pair 43 and 44, and also upstream of pair 52 and 53. The electrodes of each pair together with the circuit interconnecting them externally of the channel comprise what may be referred to as means for effecting generation of the electrical power pulse in response to magnetic field disturbance. A typical circuit interconnecting electrodes 43 and 44 is seen in FIG. 2 to include terminal posts 54 and 55 to which leads 58 and 59 are connected at 56 and 57. The leads are in turn connected to a load indicated at 60, and typically comprising a resistance chosen or matched to the generator to realize optimum power output. The circuit interconnection of electrodes 50 and 51 and also of electrodes 52 and 53 varies from that shown in FIG. 2, and is seen in FIG. 3 to include load resistance 61 and 62 in the space between the magnetic plate 37 and liner 46, and also between plate 38 and liner 48. Resistance 61 is in the circuit that includes electrode 51, while resistance 62 is in the circuit including electrode 53.

Figure 4:
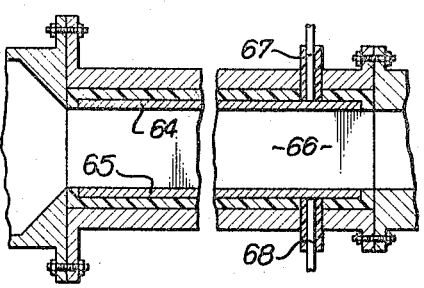
FIG. 4 is a side elevation taken through a test section modified as to electrode placement.

A variation of the channel and electroding is seen in FIG. 4 to include elongated electrodes 64 and 65 extending lengthwise of the channel 66, with terminal posts 67 and 68 provided closer to the downstream end than to the upstream end of the channel. The channel cross section is here rectangular rather than square. This arrangement promotes higher power output of the generator.

In operation, explosion of the charge 12 vaporizes the seeding film or layer 23 as well as the spacer 17, and the explosive burst travels at high velocity, well over 1,000 meters per second, down the channel, rupturing both diaphragms 32 and 34 and producing a high power pulse in the electrodes. The following example is illustrative of an actual test conducted with equipment of the type illustrated in FIG. 4 and is not meant to necessarily limit the invention to the specific values given:

| | |
|---|---|
| Channel width in direction of magnetic field | 1 inch. |
| Channel height in direction of electrode spacing | 4 inches. |
| Electrode length along channel | 18 inches. |
| Field strength | 2.35 webers/square meter. |
| Initial air pressure in channel | 10 mm. Hg. |
| Initial load resistance | 20.1 milliohms. |
| Explosive charge | Two shaped charges, with total explosive of 15 grams of RDX. |
| Seeding | Each charge seeded with 20 milligrams of cesium picrate. |
| Peak voltage | 800 volts. |
| Peak current | 30,000 amperes. |
| Peak power output | 23 megawatts. |
| Duration of output power pulse | Approximately 60 microseconds. |
| Energy delivered to load | 750 joules. |
| Velocity of detonation products in channel | 8,000 meters/sec. |

Further tests with the channel of FIG. 4 type showed that power output can be increased by using helium in the channel 66, at an initial pressure of 10 mm. Hg.

Tests with a 1 inch by 1 inch cross section channel of FIGS. 1–3 type, and with the same RDX explosive seeded with cesium picrate, showed that the optimum load for a channel should be about 5 milliohms per square inch of channel cross sectional area. The presence of argon or helium in the 1 inch square channel resulted in significant increases in power output.

Figure 5:
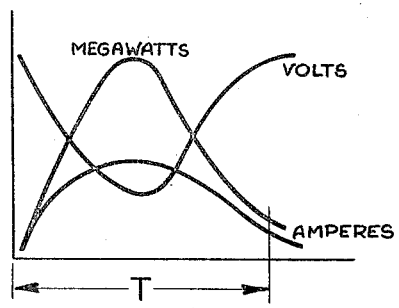
FIG. 5 is a plot of typical voltage, current and power output values over the pulse generation period for apparatus of the type illustrated in FIGS. 1–4.

Reference to FIG. 5 shows characteristic voltage, current and power variation over the pulse interval or period T, the voltage curve being inverted, i.e. measured downwardly. The power or megawatt curve should of course be proportional to the product of volts and amperes at any particular time.

I claim:
1. Apparatus to produce a high power electrical pulse, comprising means for producing a high pressure burst of ionized gas and to travel said burst along a downstream path, said means including a combustion chamber, an explosive charge and solid organic material extending about the charge in the chamber and characterized as vaporizing in response to charge explosion and as cushioning the explosive force transmitted toward the chamber wall, means to produce a magnetic field subject to sudden disturbance by said gas travel, and means for effecting generation of said electrical power pulse in response to said field disturbance.

2. Apparatus capable of producing an electrical pulse of greater than one megawatt, comprising means for producing an explosive burst of ionized gas and to travel said burst along a downstream path, said means including a combustion chamber, an explosive charge and solid organic material extending about the charge in the chamber and characterized as vaporizing in response to charge explosion and as cushioning the explosive force transmitted toward the chamber wall, means to produce a magnetic field located for sudden disturbance by said gas travel, and means including electroding located for effecting generation of said electrical power pulse in response to said field disturbance.

3. Apparatus capable of producing an electrical power pulse of greater than one megawatt, comprising means including a combustion chamber, an explosive charge, a solid organic material supporting said charge within the interior of the chamber and characterized as vaporizing in response to charge explosion and as cushioning the explosive force transmitted toward the chamber wall, and an expansion channel for producing an explosive burst of ionized gas and to travel said burst along a downstream path extending through said channel, means to produce a magnetic field traversing said path to be subject to sudden disturbance by said gas travel, and means including electroding located in such proximity to said path as to effect generation of said power pulse in response to said field disturbance.

4. Apparatus as defined in claim 3 in which said explosive charge is shaped to effect downstream travel of ionized gas at velocities greater than 1,000 meters per second.

5. Apparatus as defined in claim 4 including an additive in said combustion chamber which materially increases the electrical conductivity of said gas in response to production of said burst.

6. Apparatus as defined in claim 5 in which said additive is selected from the group consisting of cesium, potassium and exothermic compounds thereof.

7. Apparatus as defined in claim 3 in which said electroding includes spaced electrodes exposed to the interior of said channel, and said last named means includes a circuit electrically interconnecting said spaced electrodes.

8. Apparatus as defined in claim 7 in which said first named means includes an electrically insulative lining for said channel.

9. Apparatus as defined in claim 8 in which said electrodes are sunk into the insulative lining.

10. Apparatus as defined in claim 8 in which said circuit includes a conductor extending between the insulative lining and the field producing means, and said circuit includes a resistive load.

11. Apparatus as defined in claim 10 in which the resistive load is between the insulative lining and the field producing means and is closer to the downstream end of the channel than to the channel upstream end.

12. Apparatus as defined in claim 3 in which said electroding includes pairs of electrodes spaced lengthwise along said channel, the electrodes of each pair being spaced apart and exposed to the interior of the channel.

13. Apparatus as defined in claim 7 in which said spaced electrodes are elongated lengthwise of the channel.

14. Apparatus as defined in claim 7 in which the channel outwardly of said spaced electrodes comprises non-magnetic metallic material and the channel inwardly of said field producing means comprises magnetic metallic material.

15. Apparatus as defined in claim 3 in which the channel interior is at sub-atmospheric pressure immediately prior to explosion of said charge.

16. Apparatus as defined in claim 15 including means to keep the channel interior at sub-atmospheric pressure until said charge explosion, and including a rupturable diaphragm closing the downstream end of the channel.

17. Apparatus as defined in claim 3 including a shell having its interior explosable to the channel interior through the downstream end of the channel for receiving said explosive burst of ionized gas.

18. The method of producing a high power electrical pulse, that includes locating an explosive, an enveloping organic body and an additive in a confined region, detonating the explosive against the body to cushion the explosion by vaporizing the body and to produce an explosive burst of ionized gas in said region, and traveling said burst at velocities greater than 1,000 meters/second through a magnetic field and in such proximity to electroding that an electrical pulse of greater than 1 megawatt flows in said electroding, said additive characterized as materially increasing the electrical conductivity of the gas in response to production of said burst.

19. The method of claim 18 that includes maintaining the path of gas travel through said field at sub-atmospheric pressure until the gas burst arrives at said path.

20. The method of claim 18 in which said step of locating an explosive and an additive in a confined region comprises applying said additive to the surface of the explosive charge so that the additive is recessed into the explosive, and directing said applied additive toward the magnetic field.

21. The method of claim 20 in which the additive is selected from the group consisting of cesium, potassium, and exothermic compounds thereof.

References Cited by the Examiner
UNITED STATES PATENTS 3,161,789 12/1964 Nagamatsu _____ 310—11
3,225,227 12/1965 Biehl _____ 310—11

MILTON O. HIRSHFIELD, *Primary Examiner.*

DAVID X. SLINEY, *Examiner.*